(12) United States Patent
Van De Graaf

(10) Patent No.: US 7,425,314 B2
(45) Date of Patent: Sep. 16, 2008

(54) PROCESS FOR REMOVING SULPHUR COMPOUNDS INCLUDING HYDROGEN SULPHIDE AND MERCAPTANS FROM GAS STREAMS

(75) Inventor: Jolinde Machteld Van De Graaf, Amsterdam (NL)

(73) Assignee: Shell Oil Company, Houston, TX (US)

( * ) Notice: Subject to any disclaimer, the term of this patent is extended or adjusted under 35 U.S.C. 154(b) by 380 days.

(21) Appl. No.: 10/536,532

(22) PCT Filed: Nov. 28, 2003

(86) PCT No.: PCT/EP03/50908

§ 371 (c)(1),
(2), (4) Date: May 26, 2005

(87) PCT Pub. No.: WO2004/047955

PCT Pub. Date: Jun. 10, 2004

(65) Prior Publication Data

US 2006/0110305 A1    May 25, 2006

(30) Foreign Application Priority Data

Nov. 28, 2002 (EP) .................................. 02258200

(51) Int. Cl.
*B01D 53/48* (2006.01)
*B01D 53/52* (2006.01)
*C10L 3/10* (2006.01)

(52) U.S. Cl. .................. 423/220; 423/228; 423/229; 423/230; 423/242.1; 423/242.7; 423/243.01; 423/244.01; 48/127.3; 48/127.5

(58) Field of Classification Search ............... 423/220, 423/228, 229, 230, 242.1, 242.7, 243.01, 423/244.01; 48/127.3, 127.5
See application file for complete search history.

(56) References Cited

U.S. PATENT DOCUMENTS

| | | | | |
|---|---|---|---|---|
| 3,051,646 A | 8/1962 | Brooke | ........................ | 208/250 |
| 3,188,293 A | 6/1965 | Bacon et al. | ................. | 252/411 |
| 3,470,677 A | 10/1969 | Eck et al. | ........................ | 55/73 |
| 3,490,865 A * | 1/1970 | Huxley | ........................ | 423/229 |
| 3,566,611 A | 3/1971 | Sterrett | ........................... | 62/18 |
| 3,594,983 A | 7/1971 | Yearout | .......................... | 55/33 |
| 3,620,969 A | 11/1971 | Turnock et al. | .............. | 208/245 |
| 3,725,299 A | 4/1973 | Turnock et al. | .............. | 252/411 |
| 3,725,531 A | 4/1973 | Pearson et al. | .............. | 423/244 |
| 3,826,811 A | 7/1974 | Hakka | ......................... | 423/229 |
| 4,145,192 A | 3/1979 | Beise et al. | .................... | 55/32 |
| 4,311,680 A | 1/1982 | Frech | .......................... | 423/230 |
| 4,329,160 A | 5/1982 | Sherman et al. | ................ | 55/62 |
| 4,358,297 A | 11/1982 | Eberly, Jr. | ...................... | 55/62 |
| 4,784,672 A | 11/1988 | Sircar | ........................... | 55/26 |
| 4,935,399 A | 6/1990 | Blackburn et al. | ........... | 502/517 |
| 4,957,715 A | 9/1990 | Grover et al. | ................ | 423/228 |
| 4,971,682 A | 11/1990 | Clark | .......................... | 208/305 |
| 5,041,693 A | 8/1991 | Zarchy | ......................... | 585/826 |
| 5,424,051 A | 6/1995 | Nagji et al. | ................. | 423/234 |
| 5,700,438 A | 12/1997 | Miller | ......................... | 423/228 |
| 6,074,459 A | 6/2000 | Gingrich et al. | ............... | 95/118 |
| 6,843,907 B1 | 1/2005 | Kanazirev et al. | ........... | 208/213 |
| 2001/0009125 A1 | 7/2001 | Monereau et al. | ............. | 95/117 |

FOREIGN PATENT DOCUMENTS

| | | |
|---|---|---|
| CN | 1227255 | 9/1999 |
| EP | 0335034 | 10/1989 |
| GB | 2103645 | 2/1983 |
| GB | 2103646 | 2/1983 |
| GB | 2275625 | 9/1994 |
| RU | 2072886 | 2/1997 |
| RU | 2087181 | 8/1997 |
| WO | 00/56441 | 9/2000 |

OTHER PUBLICATIONS

International Search Report dated Apr. 21, 2004.

* cited by examiner

*Primary Examiner*—Timothy C Vanoy
(74) *Attorney, Agent, or Firm*—Charles W. Stewart; Leonard P. Miller

(57) ABSTRACT

A process for the removal of hydrogen sulfide and mercaptans from a gas stream containing a high ratio of mercaptans to hydrogen sulfide, wherein the first step removes hydrogen sulfide by washing the gas stream with an aqueous washing solution comprising water, a physical solvent and a chemical solvent. The first removal step is followed by a second removal step by which mercaptans are removed from the washed gas stream by means of molecular sieves.

20 Claims, No Drawings

PROCESS FOR REMOVING SULPHUR COMPOUNDS INCLUDING HYDROGEN SULPHIDE AND MERCAPTANS FROM GAS STREAMS

The present application claims priority to European Patent Application No. 02258200.1 filed 28 Nov. 2002.

The present invention relates to a process for the removal of hydrogen sulphide, mercaptans and optionally carbon dioxide and carbonyl sulphide from a gas stream containing these compounds.

The removal of sulphur-containing compounds from gas streams comprising such compounds has always been of considerable importance in the past and is even more so today in view of continuously tightening environmental regulations. This holds for combustion gases as obtained in the combustion of organic compounds as coal, as well as for natural gas streams to be used for e.g. the preparation of synthesis gas and for residential use or to be transported as liquid natural gas.

Sulphur contaminants in natural gas streams include hydrogen sulphide and mercaptans. Mercaptans, due to their odorous nature, can be detected at parts per million concentration levels. Thus, it is desirable for users of natural gas to have concentrations of mercaptans lowered to e.g. less than 5, or even less than 2 ppmv, and total concentration of sulphur compounds to e.g. less than 30 or, preferably, less than 20 ppmv, e.g. 15 or 10 ppmv. Sales gas specifications often mention total sulphur concentrations less than 4 ppmv.

Numerous natural gas wells produce what is called "sour gas", i.e. natural gas containing hydrogen sulphide, often in combination with mercaptans, the total amount of sulphur compounds being present in concentrations that makes the natural gas unsuitable for direct use. Considerable effort has been spent to find effective and cost-efficient means to remove these undesired compounds. In addition, the natural gas may also contain varying amounts of carbon dioxide and carbonyl sulphide, which depending on the use of the natural gas often have to be removed at least partly.

A number of processes are known for the removal of sulphur compounds and optionally carbon dioxide and carbonyl sulphide from gas streams as natural gas. These processes are based on physical and/or chemical absorption, solid bed adsorption and/or chemical reaction. Physical and/or chemical absorption processes suffer from the fact that they frequently encounter difficulties in reaching the low concentration of the undesired sulphur compounds, unless (extremely) large reactors are used. Solid bed adsorption processes suffer from the fact that they are only able to adsorb limited amounts of undesired compounds, while regeneration is relatively cumbersome. Especially large solid beds take relatively large amounts of time for regeneration and disproportionately large amounts of regeneration gas is needed. Chemical processes in general are able to remove carbon dioxide and/or hydrogen sulphide without large difficulties, however, they suffer from the fact that they do not effectively remove mercaptans and often produce large amounts of waste.

A special problem exist in processes in which hydrogen sulphide has to be removed in combination with a relatively high amount of mercaptans. Such processes have been described in the literature. In U.S. Pat. No. 4,957,715 a process is described in which hydrogen sulphide, alkyl mercaptans and carbon dioxide are removed from a gas stream by using an adsorbent in a first step to remove hydrogen sulphide and part of the mercaptans, followed by washing treatment in a second step to remove carbon dioxide and a further part of the mercaptans. Such a process, however, requires large amounts of (regenerable) adsorbents, especially when the amount of sulphur compounds in the feed gas is high. In U.S. Pat. No. 5,700,438 a process is described to remove hydrogen sulphide and mercaptans from gas streams by contacting the stream with copper compounds. This, however, is an expensive and laborious process. In U.S. Pat. No. 5,424,051 a process is described in which carbon dioxide, mercaptans and hydrogen sulphide are removed by first removing carbon dioxide by means of an adsorbent and removing in a second step carbon dioxide, hydrogen sulphide and mercaptans by means of alkaline scrubbing. This process is expensive and laborious. In U.S. Pat. No. 4,311,680 a process is described for the removal of hydrogen sulphide and mercaptans by using an iron oxide fixed bed, followed by regeneration of the absorbent by reaction with hydrogen peroxide. Such a process needs large amounts of absorbents, while regeneration is expensive and laborious.

It has now been found that sulphur compounds, especially hydrogen sulphide in combination with mercaptans, and optionally carbon dioxide and carbonyl sulphide, may be removed from gas streams, especially natural gas streams, by a combined process, in which in a first step in a physical/chemical absorption process most of the hydrogen sulphide, at least a part of the carbon dioxide (if present) and a part of the mercaptans is removed, while in a second step in a solid adsorption step the remaining hydrogen sulphide and the remaining mercaptans and other sulphur compounds are removed.

The above process uses the well-proven physical/chemical absorption process. Such a process has been described in for instance GB 2,103,645 and GB 2,103,646, incorporated herein by reference. Almost all hydrogen sulphide is removed in a very efficient way. When necessary, also the carbon dioxide which needs to be removed is removed in this part of the process. As only part of the mercaptans has to be removed in the first step, the process avoids the use of very large and inefficient reactors. In the second step a relatively small solid adsorption bed can be used to remove the remaining part of the mercaptans. This is due to the fact that almost all hydrogen sulphide has already been removed in the first step together with part of the mercaptans. Regeneration of such a bed is not very laborious or cumbersome. Thus, the above combination of sulphur removal processes results in an overall efficient removal of hydrogen sulphide, mercaptans and optionally part of the carbon dioxide and carbonyl sulphide, while avoiding the disadvantages of only one technology or other technologies. In addition, treating the regeneration gas of the solid bed adsorber in a dedicated absorber optimises the process. The laden solvent of the dedicated absorber is then regenerated in the same regenerator as is used for the main process.

It is observed that the use of a combined physical/chemical absorbent rather than an aqueous chemical absorbent only, also results in the possibility of flashing any carbon dioxide at relatively high pressures (i.e. between 5 and 15 bara). This reduces re-compression requirements, e.g. for re-injection.

The present invention therefore provides a process for the removal of hydrogen sulphide, mercaptans and optionally carbon dioxide and carbonyl sulphide from a gas stream comprising hydrogen sulphide, mercaptans and optionally carbon dioxide, by removing in a first step most of the hydrogen sulphide, part of the mercaptans and optionally part or most of the carbon dioxide by washing the gas stream with an aqueous washing solution comprising 10 to 45 wt %, 10 to 40 wt % of a physical solvent and 20 to 60 wt % of an amine, based on total solution water, which first removal step is followed by a second removal step in which mercaptans are removed by means of molecular sieves, in which process the amount of mercaptans which is removed by the aqueous washing stream is between 60 and 96% (of removed mercaptans), and the amount which is removed by the mol sieves is between 40 and 4% (of removed mercaptans).

The process is especially suitable for gas streams containing large amounts of hydrogen sulphide and, optionally large amounts of carbon dioxide, as both compounds are efficiently removed in the liquid adsorption process. The process is especially suitable when the ratio mercaptan/hydrogen sulphide is high, and the gas stream after the first step contains a relatively high amount of mercaptans. The process is able to deal with the common mercaptans (especially $C_1$-$C_{10}$ mercaptans, more especially $C_1$-$C_4$ mercaptans), also without any problems with methyl mercaptan, which is considered to be one of the most difficult mercaptans to be removed by means of adsorption technologies.

The feed gas for the process of the present invention may contain low as well as high amounts of sulphur compounds and carbon dioxide. Suitably the total feed gas stream comprises 0.05 to 20 vol % hydrogen sulphide, 10 to 1500 ppmv mercaptans and 0 to 40 vol % carbon dioxide, preferably 0.1 to 5 vol % hydrogen sulphide, 20 to 1000 ppmv mercaptans and 0 to 30 vol % carbon dioxide. In a special embodiment of the invention, the total gas stream comprises hydrogen sulphide in an amount between 0.15 and 1.0 vol %. The presence of these amounts of $H_2S$ hinders the removal of mercaptans, since $H_2S$ is preferentially adsorbed. Therefore, a gas stream comprising hydrogen sulphide in an amount between 0.15 and 1.0 vol % is regarded as a very difficult gas stream to remove all mercaptans from.

The process according to the invention is especially suitable for the removal of mercaptans from gas feed streams in which the ratio of mercaptans (expressed as ppmv) and the amount of hydrogen sulphide (expressed as vol %) is high. Due to this high ratio the gas stream after the first step will have a (relatively) high content of mercaptans. These mercaptans are adsorbed without problems in the second step. Thus, the process is preferably used for the purification of gas feed streams in which the ratio between the amount of mercaptans (expressed as ppmv) and the amount of hydrogen sulphide (expressed as vol %) is at least 50, more preferably at least 100, more preferably at least 200, still more preferably above 250.

Very suitably the feed gas stream is natural or associated gas, but also other gas streams can be treated, for instance hydrogen containing refinery streams, e.g. obtained after desulphurisation reaction, and syngas streams. Natural gas is a general term that is applied to mixtures of light hydrocarbons and optionally inert gases (nitrogen, carbon dioxide, helium) derived from natural gas wells. The main component of natural gas is methane. Further, often ethane, propane and butane are present. In some cases (small) amounts of higher hydrocarbons may be present, often indicated as natural gas liquids or condensates. When produced together with oil, the natural gas is usually called associated gas. Hydrogen sulphide, mercaptans, sulphides, disulphides, thiophenes and aromatic mercaptans may be present in natural gas in varying amounts..

The first step of the present invention appears to be very efficient to remove the hydrogen sulphide (and at least part of the carbon dioxide). By means of a washing process the feed gas stream is washed with a chemical solvent, an aqueous amine solution, and physical solvent. The use of aqueous amine solutions comprising a physical solvent for removing so-called acidic gases as hydrogen sulphide and optionally carbon dioxide and/or COS from a gas stream containing these compounds has been described long ago. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

On an industrial scale there are chiefly two categories of absorption solvents, depending on the mechanism to absorb the acidic components: chemical solvents and physical solvents. Each solvent has its own advantages and disadvantages as to features as loading capacity, kinetics, regenerability, selectivity, stability, corrosivity, heating/cooling requirements etc.

Chemical solvents which are useful in the process of the present invention are primary, secondary and/or tertiary amines derived alkanolamines, especially amines are derived from ethanolamine, especially monoethanol amine (MEA), diethanolamine (DEA), triethanolamine (TEA), diisopropanolamine (DIPA) and methyldiethanolamine (MDEA) or mixtures thereof.

Physical solvents which are suitable in the process of the present invention are cyclo-tetramethylenesulfone and its derivatives, aliphatic acid amides, N-methyl-pyrrolidone, N-alkylated pyrrolidones and the corresponding piperidones, methanol, ethanol and mixtures of dialkylethers of polyethylene glycols or mixtures thereof.

The mixed systems show good absorption capacity and good selectivity against moderate investment costs and operational costs. They perform very well at high pressures, especially between 20 and 90 bara. Preferably in the hydrogen sulphide removal step between 90 and 100 wt % of the hydrogen sulphide based on total weight of hydrogen sulphide present in the gas stream is removed, preferably between 95 and 100 wt %, especially hydrogen sulphide is removed till a level of less than 10 ppmv, more especially to a level of less than 5 ppmv.

The preferred physical solvent is sulfolane. The preferred amine is a secondary or tertiary amine, preferably an amine compound derived from ethanol amine, more especially DIPA, DEA, MMEA (monomethylethanolamine), MDEA, or DEMEA (diethyl-monoethanolamine), preferably DIPA or MDEA.

The aqueous washing solution comprises preferably 15 to 35 wt %, 20 to 40 wt % of a physical solvent and 40 to 55 wt % of an amine, based on total solution of water.

Very suitably the gas stream obtained in the first step is first cooled to a temperature between 5 and 45° C., preferably between 10 and 35° C., where after any condensate is separated from the gas stream, followed by the second step.

In addition, the gas stream obtained in the first step is cooled by at least 10° C., preferably 20° C.

Suitably the amount of mercaptans which is removed by the aqueous washing stream in the first step is between 70 and 93% (of removed mercaptans), preferably between 75 and 90%, and the amount which is removed by the mol sieves is between 30 and 7% (of removed mercaptans), preferably between 25 and 10%.

In the first removal step at least 90 wt % of the hydrogen sulphide is removed (based on total amount of hydrogen sulphide present in the gas stream), preferably 95 wt %, more preferably 98 wt %.

The amount of mercaptans in the gas stream which is treated in the second step is between suitably 5 and 60 ppmv, preferably between 10 and 50 ppmv.

Suitably the first step of the invention is carried out at a temperature of at least 20° C., preferably between 25 and 90° C., more preferably between 30 and 55° C., at a pressure between 15 and 90 bara. In the second step preferably a crystalline molecular sieve is used, more preferably a sieve having an average pore diameter of 5 ångström or more, especially between 6 and 13 ångström. The second step is suitably carried out at a temperature of 25° C. and a pressure between 15 and 90 bara. The regeneration of the mol sieve beds may be done with suitable inert gases. It is preferred to use a hydrocarbon stream, especially a hydrocarbon stream which is obtained by a process according to the present invention. The regeneration gas containing the mercaptans of the second step is preferably remixed with the starting gas stream. Preferably a dedicated absorber is used (similar to the absorber used in the main process).

The laden solvent of the dedicated absorber is regenerated in the same regenerator as is used in the main process.

The process according to the present invention may be carried out in a continuous mode, preferably using a continuous regeneration process of the aqueous washing solution and two or more reactors comprising the mol sieves. In the regeneration process the pressure of the laden washing solution is released, usually in one or two steps, followed by temperature increase. Preferably, the temperature increase is done in a stepwise mode. When using two or more mol sieve reactors, at least one reactor will be in the adsorbing mode and at least one reactor will be in the desorption mode. Depending on the actual situation there may be a combination of two, three, four or even more reactors, one or more in absorbing mode, the others in different stages of desorbing mode.

The second step of the present invention uses mol sieves. These mol sieves are commercially available.

Mol sieves comprise small zeolite particles dispersed in a binder, usually alumina. The zeolites comprise preferably zeolite type A or zeolite type X.

Especially suitable in the process of the present invention is the use of an adsorbent in step two comprising at least two beds containing mol sieves, one bed comprising 3 or 4 Å pore diameter mol sieves removing the water from the gas stream before it is treated in the second bed, the second bed containing mol sieves of 5 Å pore diameter or larger.

The mol sieves removing the water hardly adsorb any sulphur compounds. In general, the capacity of such mol sieves is higher than larger pore diameter mol sieves. The amount of water to be removed in the small pore diameter mol sieves is preferably at least 60 wt % of the water present, preferably at least 90 wt %. Very suitably water is removed to a level of less than 1 wt % in the treated gas, preferably less than 100 ppmwt.

The second and further beds suitably contain mol sieves of 5 Å or more, to remove the sulphur compounds. In a further preferred embodiment at least two beds are used containing the wide pore diameter mol sieves, preferably one bed containing 5 Å mol sieves, the other bed containing mol sieves of pore diameter of 6 Å and larger, preferably 13 Å. The mol sieve having the pore diameter of 5 Å removes hydrogen sulphide (if present), methyl mercaptan and some ethyl mercaptan, while the second bed removes the remainder of the ethyl mercaptan and the higher mercaptans. It will be appreciated that the above indicated beds can be applied in one single vessel, or may be spread over two or more vessels. The advantage of using more than one vessel is that each vessel may be used and regenerated under the most optimal conditions.

The laden solvent obtained in the process of the invention contains hydrogen sulphide, mercaptans and optionally carbon dioxide and carbonyl sulphide and may also contain appreciable amounts of dissolved non-acid components from the gas mixture to be purified, e.g. hydrocarbons, carbon monoxide and/or hydrogen. Suitably, the laden solvent is regenerated in a regenerator at relatively low pressure and high temperature. A lean solvent is obtained and a gas stream comprising hydrogen sulphide, mercaptans and optionally carbon dioxide and carbonyl sulphide. It may be advantageous to remove these non-acid components at least partially from the laden solvent by flashing to a pressure which is higher than the sum of the partial pressures belonging to the hydrogen sulphide and carbon dioxide present in the laden solvent. In this way only small amounts of hydrogen sulphide and carbon dioxide are released from the solvent together with the non acid compounds. In a second step the laden solvent is flashed to a pressure which is below the sum of the partial pressures of the hydrogen sulphide and carbon dioxide present in the laden solvent at the prevailing temperature, i.e. to a pressure usually between 1 and 5 bara. Flashing at atmospheric pressure is preferred. The temperature in the last flashing operation is suitably in the range of from 50 to 120° C., preferably between 60 and 90° C.

That which is claimed is:

1. A process for the removal of hydrogen sulphide and mercaptans from a gas stream having a high ratio of mercaptans to hydrogen sulphide and comprising hydrogen sulphide and mercaptans, wherein the process comprises: washing the gas stream with an aqueous washing solution comprising 10 to 45 wt % (based on total solution) of water, 10 to 40 wt % (based on total solution) of a physical solvent, and 20 to 60 wt % (based on total solution) of an amine, to yield a washed gas stream; followed by removing mercaptans from the washed gas stream by means of molecular sieves, in which process the amount of mercaptans removed by the aqueous washing solution from the gas stream is between 60 and 96% (of total removed mercaptans in steps one and two), and the amount of mercaptans removed by the molecular sieves is between 4 and 40% (of total removed mercaptans in step one and two).

2. A process according to claim 1, in which the gas stream comprises 0.05 to 20 vol % hydrogen sulphide, 10 to 1500 ppmv mercaptans and 0 to 40 vol % carbon dioxide.

3. A process according to claim 2, in which the gas stream comprises hydrogen sulphide in an amount between 0.15 and 0.6 vol %.

4. A process according to claim 3, in which the ratio of the amount of mercaptans (expressed as ppmv) to the amount of hydrogen sulphide (expressed as vol %) in the gas stream is at least 50.

5. A process according to claim 4, in which the gas stream is natural or associated gas.

6. A process according to claim 5, in which the physical solvent is sulfolane.

7. A process according to claim 6, in which the amine is a secondary or tertiary amine.

8. A process according to claim 7, in which the aqueous washing solution comprises 20 to 35 wt % based on total solution of water, 20 to 35 wt % of a physical solvent and 40 to 55 wt % of an amine.

9. A process according to claim 8, in which the washed gas stream obtained in the washing step is cooled to a temperature between 5 and 45° C., whereafter any condensate is separated from the washed gas stream.

10. A process according to claim 9, in which the washing step is carried out at a temperature of at least 20° C. and at a pressure between 15 and 90 bara.

11. A process according to claim 10, wherein the removing step uses a crystalline molecular sieve of the type selected from the group of zeolite type A and zeolite type X.

12. A process according to claim 11, wherein the removing step is carried out at a pressure between 15 and 90 bara.

13. A process according to claim 12, in which the regeneration gas of the second step containing mercaptans is remixed with the starting gas stream or is treated in a dedicated absorber.

14. A process for the removal of hydrogen sulfide and mercaptans from a gas stream that comprises hydrogen sulfide and a mercaptan and having a high ratio of mercaptans to hydrogen sulfide, wherein said process comprises:

washing said gas stream with an aqueous washing solution, comprising from 10 wt % to 45 wt % water, from 10 wt % to 40 wt % physical solvent, and from 20 wt % to 60 wt % amine, wherein said wt % is based on the total weight of said aqueous washing solution, to remove from said gas stream between 60% to 96% of the total mercaptans removed from said gas stream by said process to thereby yield a washed gas stream; and using a molecular sieve to remove from said washed gas stream a portion of the mercaptans contained in said washed gas stream amounting to between 4% to 40% of the total mercaptans removed from said gas stream by said process to thereby yield a treated gas stream having an amount of mercaptans that is less than that of said gas stream and in the range of from 5 ppmv to 60 ppmv.

15. A process as recited in claim 14, wherein said gas stream comprises from 0.05 to 20 vol % hydrogen sulfide, from 10 to 1500 ppmv mercaptan, and from 0 to 40 vol % carbon dioxide.

16. A process as recited in claim 15, further comprising: cooling said washed gas stream and separating condensate therefrom prior to said using step of said process.

17. A process as recited in claim 16, wherein said using step of said process includes the use of at least two mol sieve reactor vessels each of which contains a bed of said molecular sieve wherein at least one of said mol sieve reactor vessels is operating in an adsorbing mode and at least one of said mol sieve reactor vessels is operating in a desorption mode.

18. A process as recited in claim 17, further comprising: utilizing a portion of said treated gas stream as a regeneration gas for regenating said bed of molecular sieve of said at least one of said mol sieve reactor vessels operating in said desorption mode to yield a regenerating gas containing mercaptans.

19. A process as recited in claim 18, further comprising: mixing said regenerating gas containing mercaptans with said gas stream that undergoes said washing step.

20. A process as recited in claim 19, wherein said physical solvent is sulfolane.

* * * * *